(12) United States Patent
Tang et al.

(10) Patent No.: US 8,565,814 B2
(45) Date of Patent: Oct. 22, 2013

(54) RADIO FREQUENCY COMMUNICATION DEVICES AND METHODS

(75) Inventors: Weimin Tang, Singapore (SG); Ern Teng Chu, Singapore (SG); Hon Kong Lok, Singapore (SG); Wei Dong Chen, Singapore (SG)

(73) Assignee: Intel Mobile Communications GmbH, Neubiberg (DE)

( * ) Notice: Subject to any disclaimer, the term of this patent is extended or adjusted under 35 U.S.C. 154(b) by 402 days.

(21) Appl. No.: 12/200,132

(22) Filed: Aug. 28, 2008

(65) Prior Publication Data

US 2010/0056204 A1    Mar. 4, 2010

(51) Int. Cl.
*H04M 1/515* (2006.01)
(52) U.S. Cl.
USPC .............. 455/553.1; 455/168.1; 455/307; 455/143; 455/144; 455/276.1
(58) Field of Classification Search
None
See application file for complete search history.

(56) References Cited

U.S. PATENT DOCUMENTS

| | | | |
|---|---|---|---|
| 2,622,150 A * | 12/1952 | Coulter et al. ............... 330/149 |
| 3,728,731 A | 4/1973 | Choi et al. |
| 3,781,684 A | 12/1973 | Inslerman |
| 4,910,481 A | 3/1990 | Sasaki et al. |
| 5,815,804 A | 9/1998 | Newell et al. |
| 5,973,568 A | 10/1999 | Shapiro et al. |
| 6,072,999 A | 6/2000 | Konishi et al. |
| 6,332,071 B1 | 12/2001 | Brandt |
| 6,356,536 B1 | 3/2002 | Repke |
| 6,448,932 B1 | 9/2002 | Stoiljdovic et al. |
| 6,531,984 B1 | 3/2003 | Johannisson et al. |
| 6,624,720 B1 | 9/2003 | Allison et al. |
| 6,670,923 B1 | 12/2003 | Kadambi et al. |
| 6,907,263 B2 * | 6/2005 | Ho et al. .................... 455/552.1 |
| 7,043,285 B2 | 5/2006 | Boyle |
| 7,057,472 B2 | 6/2006 | Fukamachi et al. |
| 7,155,252 B2 | 12/2006 | Martin et al. |
| 7,251,459 B2 | 7/2007 | McFarland et al. |
| 7,253,702 B2 | 8/2007 | Kemmochi et al. |
| 7,333,831 B2 | 2/2008 | Srinivasan et al. |
| 7,373,115 B2 | 5/2008 | Monroe |
| 7,376,440 B2 | 5/2008 | Forrester et al. |
| 7,397,324 B2 | 7/2008 | Tang et al. |
| 7,894,779 B2 | 2/2011 | Meiyappan et al. |
| 2002/0006810 A1 | 1/2002 | Schiller |
| 2002/0183016 A1 | 12/2002 | Kemmochi et al. |
| 2003/0092397 A1 | 5/2003 | Uriu et al. |
| 2004/0033787 A1 | 2/2004 | Weber et al. |
| 2006/0063493 A1 | 3/2006 | Yanduru et al. |
| 2006/0178122 A1 * | 8/2006 | Srinivasan et al. ......... 455/168.1 |

(Continued)

OTHER PUBLICATIONS

U.S. Appl. No. 12/123,595, filed May 20, 2004, Tang et al.

(Continued)

*Primary Examiner* — Yuwen Pan
*Assistant Examiner* — Fanghwa Wang
(74) *Attorney, Agent, or Firm* — Eschweiler & Associates, LLC

(57) ABSTRACT

One embodiment relates to a circuit for efficient wireless communication. The circuit includes an antenna interface module adapted to receive multiple frequency components via an antenna. Multiple reception paths stem from the antenna interface module, where different reception paths are associated with different frequency components. The circuit also includes multiple filter elements having inputs respectively coupled to the multiple reception paths. At least two of the filter elements cooperatively form a differential output signal based on their respective frequency components. Other methods and systems are also disclosed.

15 Claims, 4 Drawing Sheets

(56) References Cited

U.S. PATENT DOCUMENTS

| | | | |
|---|---|---|---|
| 2007/0105515 A1* | 5/2007 | Muterspaugh et al. | 455/234.1 |
| 2007/0223615 A1* | 9/2007 | Dosanjh et al. | 375/267 |
| 2008/0204163 A1 | 8/2008 | Royak et al. | |
| 2008/0214138 A1* | 9/2008 | Gomez | 455/307 |
| 2009/0153269 A1 | 6/2009 | Ono et al. | |
| 2009/0289861 A1 | 11/2009 | Tang et al. | |

OTHER PUBLICATIONS

U.S. Appl. No. 12/123,730, filed May 20, 2008, Tang et al.

Radio Front-End Solutions, "MMM6025 GSM/GPRS Quad-Band, Front-End Power Amplifier Plus Antenna Switch", Freescale Semiconductor, Inc., 2004, 2 pgs.

TriQuint Semiconductor, TQM6M4001 Advance Data Sheet, "3V Quad-Band GSM850/900 DCS/PCS Transmit Module", Revision 2.23, Feb. 3, 2005, 18 pgs.

Non-Final Office Action Dated Jan. 28, 2011 for U.S. Appl. No. 12/123,595. 27 Pages.

Non-Final Office Action Dated Feb. 4, 2011 for U.S. Appl. No. 12/123,730.

Non-Final Office Action Dated Jun. 2, 2011 for U.S. Appl. No. 12/123,730. 20 Pages.

Office Action Dated Nov. 4, 2011 for U.S. Appl. No. 12/123,595.

Final Office Action Dated Jun. 30, 2011 for U.S. Appl. No. 12/123,595. 16 Pages.

Final Office Action Dated Oct. 5, 2011 for U.S. Appl. No. 12/123,730.

Final Office Action dated Feb. 28, 2012 issued to U.S. Appl. No. 12/123,595.

Notice of Allowance Dated May 3, 2012 for U.S. Appl. No. 12/123,595.

* cited by examiner

RADIO FREQUENCY COMMUNICATION DEVICES AND METHODS

FIELD OF DISCLOSURE

The present disclosure relates generally to methods and systems related to radio frequency (RF) communication devices.

BACKGROUND

In emerging markets throughout the world, such as China and India, the rising middle and low-to-middle classes are demanding affordable wireless services. This requires wireless service providers to provide these customers with affordable access service as well as affordable handsets.

To deliver low cost handsets, engineers are continuously looking for ways to modify existing mobile phone architectures to achieve a lower cost design without giving up quality or desirable features. In addition, engineers are continuously looking to improve phones by including multi-band communication transceivers, such as quad-band transceivers. These multi-band transceivers allow users to use a single phone to roam between countries having different mobile phone frequency components. Multiple frequency components may also allow better coverage within a single country.

Accordingly, there is a large market for phones that provide good performance at a low-cost.

SUMMARY

The following presents a simplified summary in order to provide a basic understanding of one or more embodiments. This summary is not an extensive overview, nor is it intended to identify key or critical elements of the disclosure. Rather, the primary purpose of the summary is to present some concepts in a simplified form as a prelude to the more detailed description that is presented later.

One embodiment relates to a circuit for efficient wireless communication. The circuit includes an antenna interface module adapted to receive multiple frequency components via an antenna. Multiple reception paths stem from the antenna interface module, where different reception paths are associated with different frequency components. The circuit also includes multiple filter elements having inputs respectively coupled to the multiple reception paths. At least two of the filter elements cooperatively form a differential output signal based on their respective frequency components.

The following description and annexed drawings set forth in detail certain illustrative aspects and implementations. These are indicative of only a few of the various ways in which the principles of the disclosure may be employed.

DETAILED DESCRIPTION

Figure 1:
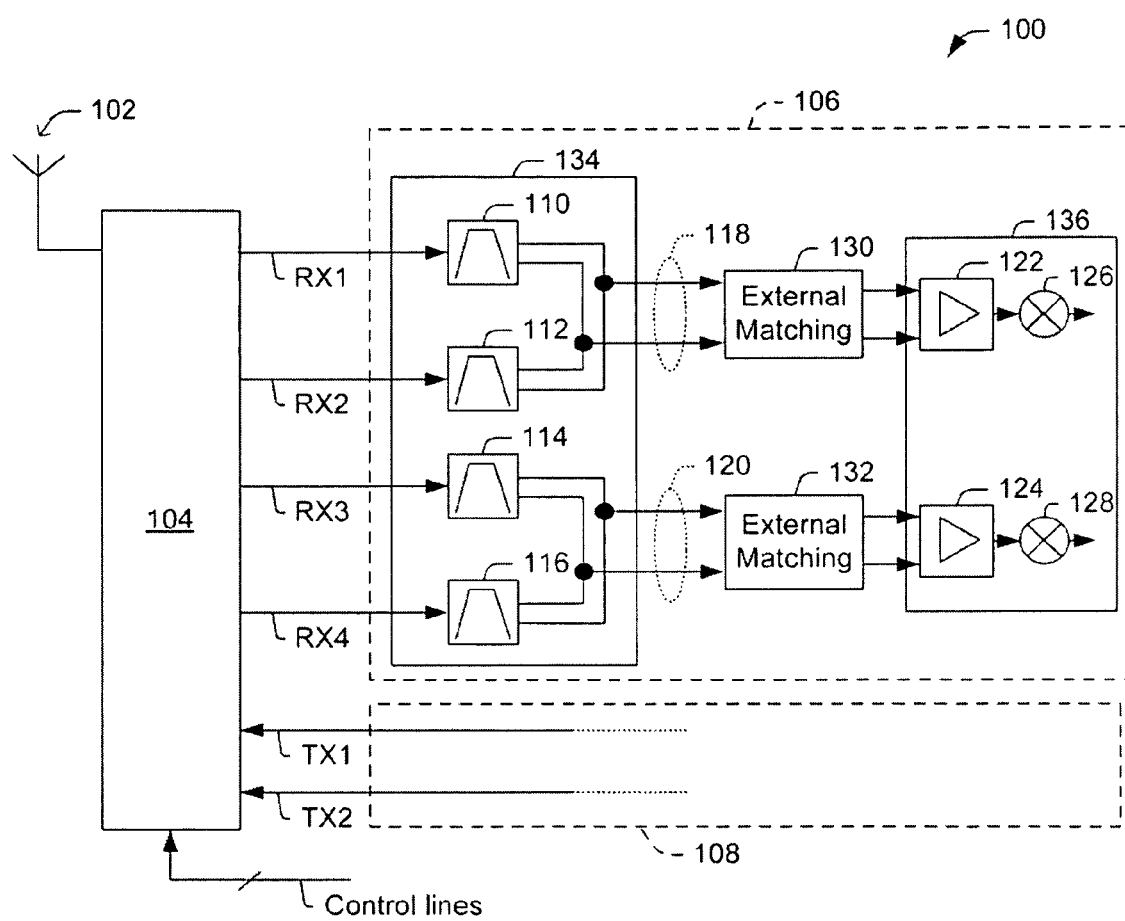
FIG. 1 shows a transceiver portion of a wireless communication device with a quad-band receiver.

One or more implementations will now be described with reference to the attached drawings, wherein like reference numerals are used to refer to like elements throughout. It will be appreciated that nothing in this specification is admitted as prior art.

FIG. 1 shows a transceiver architecture 100 (i.e., transmitter and receiver) that is suitable for quad-band mobile phones and other multi-band communication devices. The transceiver 100 includes an antenna 102 and an antenna interface module 104. Depending on whether data is transmitted or received, the antenna interface module 104 can exchange data between the antenna 102 and one of several reception paths 106 or transmission paths 108.

To receive data, the antenna interface module 104 passes data from the antenna 102 to one of four reception paths (RX1, RX2, RX3, RX4). Which reception path is selected depends on the frequency band in which data is to be received. For example, in one GSM embodiment, the first reception path RX1 is associated with an 850 MHz band, the second reception path RX2 is associated with a 900 MHz band, the third reception path RX3 is associated with an 1800 MHz band, and the fourth reception path RX4 is associated with a 1900 MHz band. In some 3G embodiments, the first/second/third/fourth reception bands could be respectively associated with 800/850/1900/2100 or 850/1700/1900/2100 frequency components. Other frequencies could also be used.

Each reception path includes a filter element having an input that receives a frequency component falling within a frequency band of that reception path. Thus, the illustrated embodiment includes a first filter element 110, a second filter element 112, a third filter element 114, and a fourth filter element 116 respectively coupled to reception paths RX1, RX2, RX3, RX4. Each filter element passes the frequency component associated with its respective reception path to its output, while concurrently blocking other unwanted frequency components. In some embodiments, each filter element comprises a surface acoustic wave (SAW) filter, but could also comprise other types of filter in other embodiments.

The filters elements are arranged so that outputs of at least two filter elements cooperatively provide a differential output. This differential output is based on the reception frequencies that were received at the inputs of the filters. For example, the first and second filter elements 110, 112 form a first differential output 118. Similarly, the third and fourth filter elements 114, 116 form a second differential output 120.

First and second amplification elements 122, 124 amplify the differential signals 118, 120, respectively, and provide amplified signals mixers 126, 128 for down-conversation. In one embodiment, the amplification elements 122, 124 comprise low-noise amplifiers (LNAs). Matching circuitry, 130, 132, such microstrip transmission line, couples each differential output to its respective amplification element in some embodiments.

By arranging the filter elements to cooperatively provide differential outputs, the number of amplification elements is reduced in comparison to previous solutions. This reduces costs relative to previous solutions. In addition, in some embodiments, the filter elements can be manufactured in a first integrated circuit 134 and the amplification elements can be manufactured in a second integrated circuit 136. When separate integrated circuits are used, the number of pins and balls needed for the interface between these integrated circuits can be reduced by using one pair of differential signals instead of two or more pairs of differential signals. This further reduces costs relative to previous solutions. In this manner, the single pair of differential outputs 118, 120 reduce the costs associated with manufacturing a wireless transceiver, improving the cost-points of such products.

Figure 2:
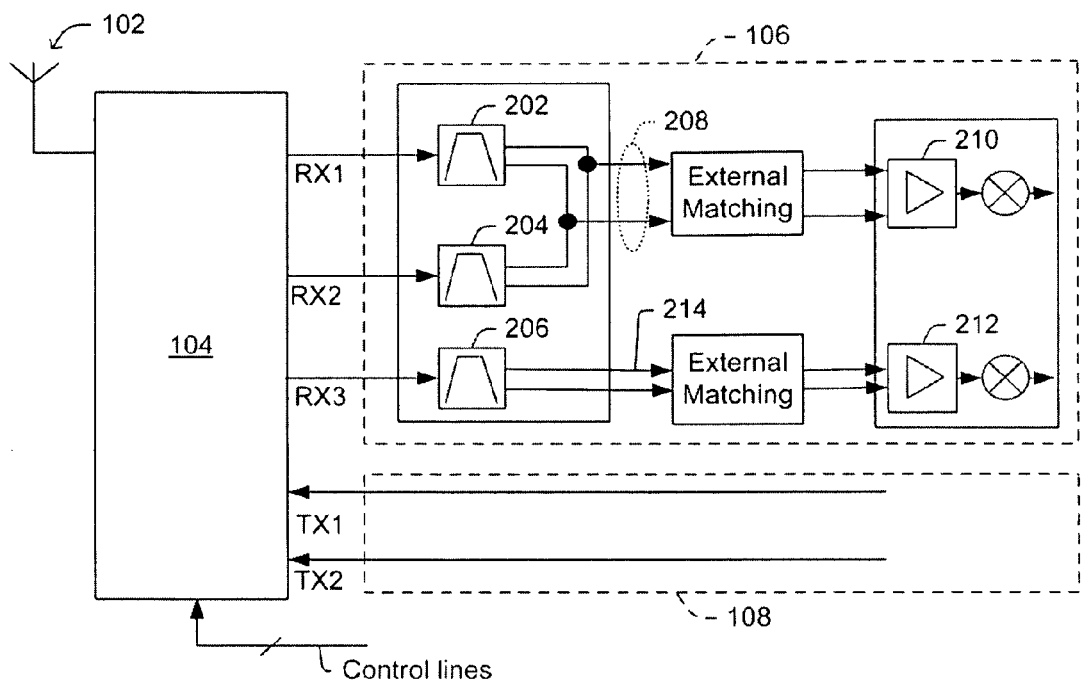
FIG. 2 shows a transceiver portion of a wireless communication device with a tri-band receiver.
Figure 3:
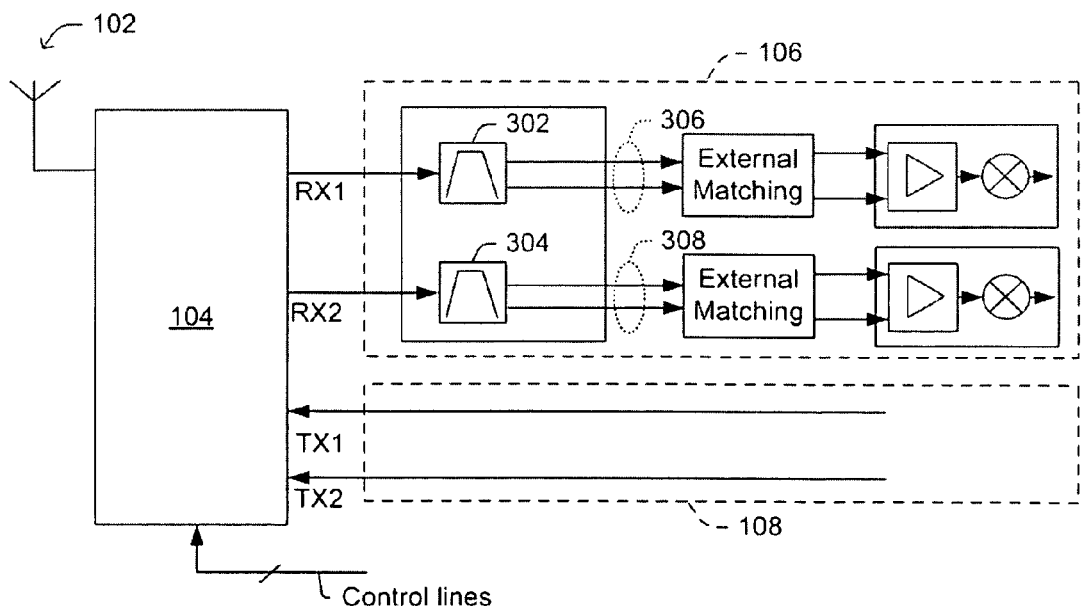
FIG. 3 shows a transceiver portion of a wireless communication device with a dual-band receiver.

Although FIG. 1 shows an embodiment with four reception paths, other embodiments can include other numbers of reception paths. For example, FIG. 2 shows a tri-band architecture 200 having three reception paths RX1, RX2, RX3 and three filter elements 202, 204, 206 respectively coupled thereto. First and second filter elements 202, 204 collectively form a differential signal 208 that is passed to an amplification element 210. The third reception path RX3 and third filter 206 are associated with another amplification element 212 that amplifies the single-ended output 214. FIG. 3 shows a dual-band architecture 300 having two reception paths RX1, RX2 and two filters 302, 304 that form two separate differential signals 306, 308. In other multi-band embodiments, a quint-band architecture could utilize five reception paths and filters, a six-band architecture could utilize six reception paths and filters, and so on. These other multi-band embodiments could use a combination of single frequency differential signals and multi-frequency differential signals, where each differential signal is communicated between a filter element and a respective amplification element.

Figure 4:
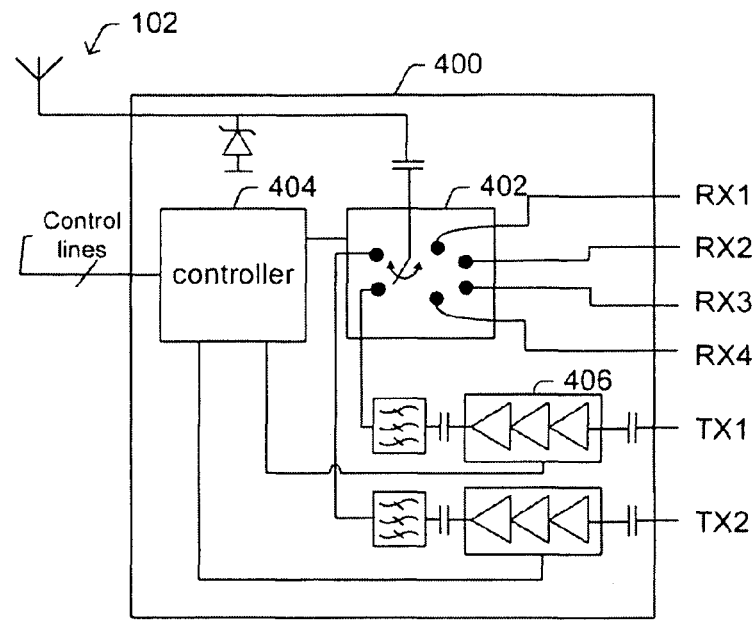
FIG. 4 shows an embodiment of an antenna interface module that includes a switch module.
Figure 5:
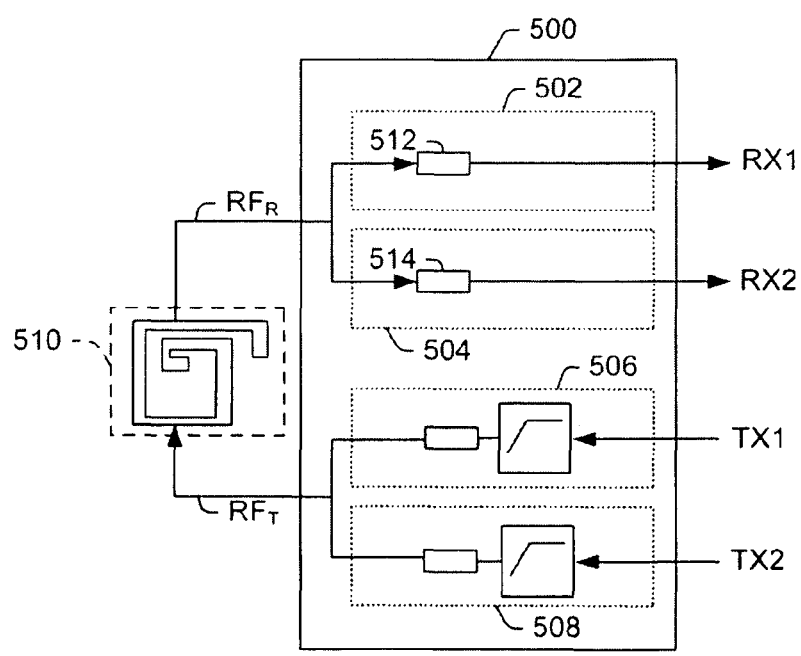
FIG. 5 shows another embodiment of an antenna interface module that includes phase shift select circuits.

Referring now to FIGS. 4-5, one can see two different embodiments for the antenna interface module 104. FIG. 4 depicts an antenna interface module 400 that includes a switch 402 that selectively couples one of the transmission paths (TX1 or TX2) or reception paths (RX1, RX2, RX3, or RX4) to the antenna 102. FIG. 5 shows an antenna interface module 500 that uses transmission and reception phase shift select circuits 502, 504 that are continuously coupled to the antenna, but which provide different respective impedances at different frequencies. Because FIG. 5's phase shift select circuits 502, 504 may be more affordable to implement than FIG. 4's switch 402, the antenna interface module 500 may be more cost-effective to implement.

In FIG. 4, a controller 404 sets the position of the switch 402 based on whether a frame is a transmission time frame or a reception time frame. For example, if the frame is a reception frame associated with RX1's frequency, the controller 404 moves the switch 402 to couple the antenna 102 to RX1. If the frame is a transmission frame associated with TX1's frequency, the controller 404 will set the switch 402 to TX1 and provide control to an amplifier 406 to transmit a suitable signal.

In FIG. 5, the antenna interface module includes reception phase shift select circuits 502, 504 and transmission phase shift selection circuits 506, 508, rather than a switch. These phase shift selection circuits are all continuously physically coupled to a dual-feed antenna 510, such as a planar inverted F antenna.

During reception on the receive side, the antenna receives a received signal $RF_R$. This reception signal $RF_R$ often includes desired frequency components and undesired frequency components. To separate out the desired frequency components, the first and second reception phase shift selection circuits 502, 504, respectively, have different impedances that vary as a function of frequency. For example, the first reception phase shift selection circuit 502 is structured to represent an approximately matched impedance (e.g., 50 ohms) at the reception frequency of RX1, and the second reception phase shift selection circuit 504 is structured to represent a high or infinite impedance at the reception frequency of RX1. Consequently, only frequency components of RX1 pass through the first reception phase shift selection circuit 502 (i.e., frequency components of RX2 will be blocked from RX1). Similarly, only frequency components of RX2 pass through the second reception phase shift selection circuit 504 (i.e., frequency components of RX1 will be blocked from RX2). To facilitate this behavior, the reception phase shift selection circuits 512 and 514 are tuned to the proper frequency. Similar structure and functionality may be included on the transmit-side.

Figure 6:
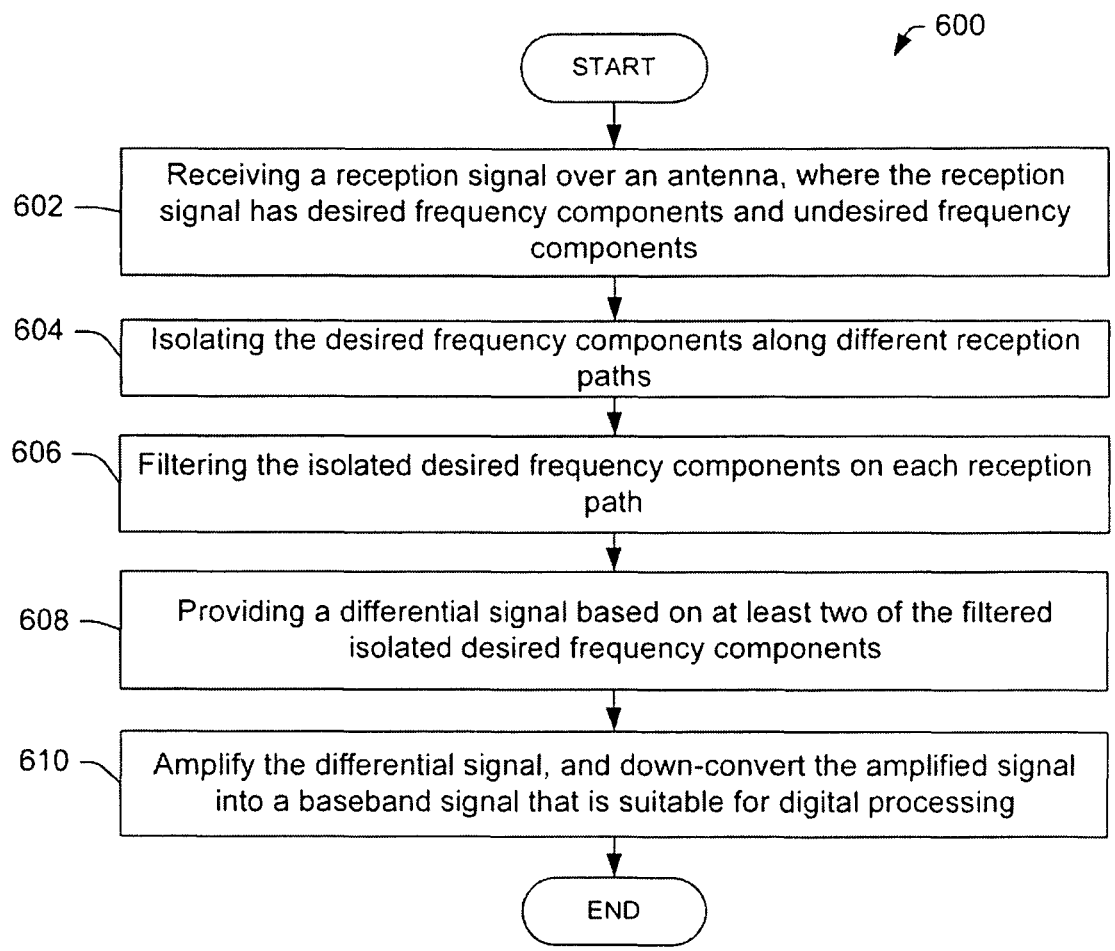
FIG. 6 shows a flow chart illustrating a method for efficiently processing a wireless signal.

Now that some examples of systems have been discussed, reference is made to FIG. 6, which shows a method 600 for receiving a wireless signal. While this method is illustrated and described below as a series of acts or events, the present disclosure is not limited by the illustrated ordering of such acts or events. For example, some acts may occur in different orders and/or concurrently with other acts or events apart from those illustrated and/or described herein. In addition, not all illustrated acts are required. Further, one or more of the acts depicted herein may be carried out in one or more separate acts or phases.

FIG. 6 starts at 602, where a reception signal is received over an antenna. The reception signal can include desired frequency components and undesired frequency components.

At 604, the desired frequency components are isolated along different reception paths.

At 606, the isolated desired frequency components are filtered along each reception path.

At 608, at least two filtered signals are combined to form a differential signal.

At 610, the differential signal is amplified and down-converted into a baseband signal. This baseband signal can be analyzed and ultimately presented over a user interface. For example, the user interface could include a speaker or a visual display on a mobile phone, among others.

Although several implementations have been illustrated and described, alterations and/or modifications may be made to the illustrated examples without departing from the spirit and scope of the appended claims. For example, although some embodiments describe a wireless communication device as a cellular phone, in other embodiments the wireless communication device could be another type of communication device, including but not limited to: a personal digital assistant, a pager, a walkie-talkie, a music device, a laptop, etc.

Some methods and corresponding features of the present disclosure can be performed by hardware modules, software routines, or a combination of hardware and software. To the extent that software is employed, the software may be provided via a "computer readable medium", which includes any medium that participates in providing instructions to the processor. Such a computer readable medium may take numerous forms, including but not limited to, non-volatile media, volatile media, and transmission media. Non-volatile media includes, for example, optical disks (such as CDs, DVDs, etc.) or magnetic disks (such as floppy disks, tapes, etc.). Volatile media includes dynamic memory, such as ferroelectric memory, SRAM, or DRAM. Transmission media includes coaxial cables, copper wire, fiber optics, etc. that could deliver the instructions over a network or between communication devices. Transmission media can also include electromagnetic waves, such as a voltage wave, light wave, or radio wave.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations. In addition, while a particular feature may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

What is claimed is:

1. A circuit for efficient wireless communication, comprising:
   an antenna port to be coupled to an antenna, wherein the antenna is adapted to receive wireless signals having multiple frequency components;
   multiple reception path ports coupled to the antenna port to isolate different respective frequency components included in the wireless signals;
   multiple filter elements having respective inputs coupled to the multiple reception path ports, respectively, where at least two of the filter elements cooperatively form a differential output signal on an output terminal common to the at least two filter elements;
   a single amplification element coupled to the common output terminal and adapted to provide an amplified signal based on the differential output signal, wherein no amplification elements other than the single amplification element are coupled to the common output terminal; and
   multiple phase shift selection circuits respectively associated multiple reception paths and continuously physically coupled to the antenna, wherein each phase shift selection circuit is adapted to provide an approximately matched impedance for its own respective frequency component while concurrently providing an unmatched impedance for the other frequency components.

2. The circuit of claim 1, further comprising:
   a mixer adapted to receive the amplified signal.

3. The circuit of claim 1, further comprising:
   matching circuitry between the at least two filter elements and the single amplification element.

4. The circuit of claim 3, where the matching circuitry is incorporated into the filter elements.

5. The circuit of claim 1, where the antenna interface module comprises:
   an antenna switch module adapted to selectively switch between the reception path ports and at least one transmission path port.

6. The circuit of claim 1, where the antenna interface module comprises:
   multiple phase shift selection circuits respectively associated the multiple reception path ports, where each phase shift selection circuit is adapted to provide an approximately matched impedance for its own respective frequency component while concurrently providing an unmatched impedance for the other frequency components.

7. The circuit of claim 6, where the phase shift selection circuits are continuously physically coupled to the antenna.

8. The circuit of claim 1, where each filter element is a surface acoustic wave (SAW) filter.

9. A wireless communication device, comprising:
   an antenna interface module adapted to exchange data between an antenna and a number of communication paths, wherein each communication path is associated with a different frequency component;
   a number of filter elements respectively coupled to the number of communication paths; wherein first and second filter elements are adapted to cooperatively form a first differential output signal based on first and second frequency components associated with first and second communication paths;
   a number of amplification elements having respective inputs coupled to outputs of the number of filter elements and adapted to provide an amplified signal based on the first differential output signal, wherein at least two filter elements have their respective outputs coupled to the same power amplifier such that the number of amplification elements is less than the number of filter elements; and
   the antenna interface module comprises:
   multiple phase shift selection circuits respectively associated the number of communication paths and continuously physically coupled to the antenna, wherein each phase shift selection circuit is adapted to provide an approximately matched impedance for its own respective frequency component while concurrently providing an unmatched impedance for the other frequency components.

10. The wireless communication device of claim 9, where the wireless communication device comprises a quad-band phone.

11. The wireless communication device of claim 9, where the first and second filter elements are coupled to communication paths carrying frequencies of approximately 850 MHz and approximately 900 MHz, respectively.

12. The wireless communication device of claim 9, further comprising:
   third and fourth filter elements coupled to third and fourth of the number of communication paths, respectively; the third and fourth filter elements adapted to cooperatively form a second differential output signal based on third and fourth frequency components associated with the third and fourth communication paths.

13. The wireless communication device of claim 12, further comprising:
   a first amplification element adapted to amplify the first differential output signal; and
   a second amplification element adapted to amplify the second differential output signal.

14. The wireless communication device of claim 9, further comprising:
   first matching circuitry between the first amplification element and the first and second filter elements; and
   second matching circuitry between the second amplification element and the third and fourth filter elements.

15. The wireless communication device of claim 9:
   where the first and second filter elements are adapted to isolate frequencies of approximately 850 MHz and approximately 900 MHz, respectively; and
   where the third and fourth filter elements are adapted to isolate frequencies of approximately 1800 MHz and approximately 1900 MHz, respectively.

* * * * *